United States Patent
Park et al.

(10) Patent No.: US 7,505,494 B2
(45) Date of Patent: Mar. 17, 2009

(54) SYSTEM AND METHOD FOR CONTROLLING WAVELENGTH OF A LASER BEAM

(75) Inventors: Young-Ho Park, Gyeonggi-do (KR); Si-Yeong Gwag, Gyeonggi-do (KR); Yoo-Keun Won, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 232 days.

(21) Appl. No.: 11/223,195

(22) Filed: Sep. 8, 2005

(65) Prior Publication Data

US 2006/0083274 A1 Apr. 20, 2006

(30) Foreign Application Priority Data

Oct. 15, 2004 (KR) ............... 10-2004-0082560

(51) Int. Cl.
*H01S 3/13* (2006.01)
(52) U.S. Cl. .................. 372/32; 372/29.02; 372/57
(58) Field of Classification Search ............ 372/32, 372/29.02, 57
See application file for complete search history.

(56) References Cited

U.S. PATENT DOCUMENTS

| | | | | |
|---|---|---|---|---|
| 4,952,945 A * | 8/1990 | Hikima | ............... | 347/247 |
| 5,329,336 A * | 7/1994 | Hirano et al. | ............... | 355/53 |
| 5,597,670 A * | 1/1997 | Aketagawa et al. | ............... | 430/30 |
| 6,067,306 A * | 5/2000 | Sandstrom et al. | ............... | 372/38.01 |
| 6,493,066 B1 * | 12/2002 | Miwa | ............... | 355/67 |
| 6,730,925 B1 * | 5/2004 | Ozawa | ............... | 250/548 |
| 6,822,977 B1 * | 11/2004 | Stamm et al. | ............... | 372/9 |
| 2002/0131032 A1 * | 9/2002 | Tsuji et al. | ............... | 355/73 |
| 2005/0112853 A1 * | 5/2005 | Kuzbyt et al. | ............... | 438/514 |

FOREIGN PATENT DOCUMENTS

| | | |
|---|---|---|
| JP | 2000-106463 | 4/2000 |
| WO | WO 96/07085 | 3/1996 |
| WO | WO 9908156 | 2/1999 |

OTHER PUBLICATIONS

Chen et al., "Wavelength detector using a pair of metal-semiconductor-metal photodetectors with subwavelength finger spacings", Aug. 1, 1996, IEEE, Electronic Letters, vol. 32, No. 16, 1510-1511.*
English language abstract of Japanaese Publication No. 2000-106463.

* cited by examiner

*Primary Examiner*—Minsun Harvey
*Assistant Examiner*—Joshua King
(74) *Attorney, Agent, or Firm*—Marger Johnson & McCollom, P.C.

(57) ABSTRACT

A system of controlling a wavelength of a laser beam is provided. The system comprises a stage for supporting a wafer, an optical convergence unit for emitting the laser beam moving in an optical path toward the stage, and a specific wavelength detecting sensor. The specific wavelength detecting sensor is disposed between the optical convergence unit and the stage. It includes a laser beam absorbing structural body for absorbing a specific wavelength of the laser beam emitting toward the stage. A wavelength controlling unit for selectively controlling the wavelength of the laser beam is also provided.

17 Claims, 3 Drawing Sheets

SYSTEM AND METHOD FOR CONTROLLING WAVELENGTH OF A LASER BEAM

This application claims the priority of Korean Patent Application No. 10-2004-0082560, filed on Oct. 15, 2004, in the Korean Intellectual Property Office, the disclosure of which is incorporated herein in its entirety by reference.

BACKGROUND OF THE INVENTION

1. Field of the Invention

The present invention relates to a laser system such as an excimer laser, and more particularly, to a system and method for detecting and controlling a specific wavelength of a laser beam.

2. Description of the Related Art

Generally, a laser such as an excimer laser is applied widely for semiconductor fabrication. An output wavelength of the excimer laser should be accurately controlled to have a constant value as a function of time and operation state. Particularly, when a semiconductor integrated circuit is manufactured, an accurate control of the output wavelength is essential.

An opto-galvanic sensor has been used in a method of controlling an accurate wavelength. The opto-galvanic sensor uses resonance between an incident laser beam and plasma. Resonance is caused by a cathode and gas filled within the sensor. That is, the opto-galvanic sensor uses a property in which an electrical characteristic of the plasma is varied when a wavelength of the laser beam resonates with a specific absorbed wavelength of atom and molecule of the plasma. However, a method of detecting the wavelength of the laser beam by using the opto-galvanic sensor has a disadvantage in that it is difficult to accurately arrange the sensor and the laser beam, and it is difficult to use a diffuser. In order to solve the above drawback, a Hollow Cathode Lamp (HCL) is used to measure an amount of the laser beam absorbed by a volatile material disposed inside a vacuum chamber of the sensor.

FIG. 1 is a schematic view illustrating a conventional system of detecting a wavelength of the laser beam by using the hollow cathode lamp.

Referring to FIG. 1, a laser system 10 includes a laser 13, a wave meter 11 for sampling a laser beam (A) and determining a wavelength of the sampled laser beam (A), and a wavelength controlling unit 15 for selectively controlling the wavelength of the laser beam (A) at a specific wavelength range. The wave meter 11 controls the wavelength thereby controlling unit 15. That is, if the detected laser beam (A) does not have the same wavelength as desired, the wave meter 11 sends a correction signal to the wavelength controlling unit 15 to control the value of the wavelength of the detected laser beam (A).

The laser beam (A) passing through the wave meter 11 is divided into a first beam (A1) and a second beam (A2) by using a first beam splitter. The second beam (A2) passes through a diaphragm 34 and a diffuser 32 for widening the width and the span of the beam to be incident with the wavelength detecting system having the hollow cathode lamp 40.

The wavelength detecting system includes the hollow cathode lamp 40, a current controlling unit 47 and an optical detector 49. The hollow cathode lamp 40 includes a vacuum chamber 42, an anode 43, and a cathode 44 disposed inside the vacuum chamber 42. The vacuum chamber 42 includes an input window 41 for inputting the incident laser beam (A2) and an output window 45 for outputting the laser beam (A2). Here, the cathode 44 is generally formed of a cylindrical volatile metal material, for example, iron (Fe). The vacuum chamber 42 is filled with gas such as neon.

The current controlling unit 47 controls the amount of current flowing through the anode 43 and the cathode 44. The volatile material fills the cathode 44 through which the second beam (A2) passes. Gas volatilized from the volatile material and an inert gas such as neon form the plasma to absorb the second beam (A2) at a wavelength determined by a characteristic of the plasma. For example, if iron is the volatile material it absorbs the laser beam with a maximum wavelength of about 248 to 3271 nm.

Some of the absorbed laser beam (A2) is transmitted through the output window 45, and the optical detector 49 detects the amount of the transmitted beam. The detected amount of the beam depends on the wavelength of the second beam (A2). The optical detector 49 relatively detects the amount of beam with a minimum wavelength of about 248 to 3271 nm. The detected amount of beam is transmitted to the first controller 50, and the first controller 50 again controls the wavelength of the laser beam (A) emitted from the wave meter 11 and from the wavelength controlling unit 15.

Meanwhile, the first beam (A1) passing through the first beam splitter 30 is transmitted to a reticle 68, after passing through a beam conditioner 60, a beam condenser 62, a second beam splitter 64 and a lens 66. The optical convergence unit 70 irradiates the beam passing through the reticle 68 onto a wafer 82 seated on a stage 80. The stage 80 moves in an X-axis and a Y-axis in the same plane by using an X-Y controller 84.

Further, the first beam (A1) passes through the optical convergence unit 70 to become a third beam (A3) with intensity and uniformity varied. The third beam (A3) is substantially irradiated on the wafer 82, and its intensity and uniformity is detected using a beam sensor 90 before it is irradiated on the wafer 82. The detected result is used to allow a second controller 92 to again determine the laser beam (A) emitted from the laser system 10.

However, the beam sensor 90 can check the intensity and the uniformity of the third beam (A3), but cannot detect a specific wavelength of the third beam (A3) irradiated on the wafer 82. That is, it cannot check whether or not the third beam (A3) which directly irradiated the wafer 82 has the specific wavelength. Further, the conventional specific wavelength detecting sensor should include separate devices such as the current controlling unit 47 and the optical detector 49 for driving the detection process. Accordingly, the conventional specific wavelength detecting sensor has a difficulty in simplifying the equipment, and is disadvantageous in an economic aspect.

SUMMARY OF THE INVENTION

The present invention provides a system of detecting a specific wavelength of a laser beam directly irradiated on a wafer, to control the detected wavelength of the laser beam.

Also, the present invention provides a method of detecting a specific wavelength of a laser beam directly irradiated on a wafer, to control the detected wavelength of the laser beam.

According to an aspect of the present invention, a system of controlling a wavelength of a laser beam is provided. The system comprises a stage for supporting a wafer and an optical convergence unit for emitting the laser beam moving in an optical path toward the stage. A specific wavelength detecting sensor, disposed between the optical convergence unit and the stage, includes a laser beam absorbing structural body for absorbing a specific wavelength of the laser beam emitting toward the stage. The stage can be moved in a straight line and/or rotational path. A wavelength controlling unit is also provided for selectively controlling the wavelength of the laser beam.

The specific wavelength detecting sensor is preferably disposed within a transparent tube. The transparent tube more preferably comprises a transparent vacuum tube which is maintained under vacuum. The specific wavelength detecting sensor can further comprise a current sensor electrically connected with the laser beam absorbing structural body to sense a variation in the laser beam varies the conductive rate of the structural body. This current sensor can be electrically connected with the wavelength controlling unit.

The laser beam absorbing structural body preferably absorbs the laser beam with the specific wavelength for varying its conductive rate. The laser beam absorbing structural body can also have at least one planar surface substantially perpendicular to the optical path of the laser beam. The laser beam absorbing structural body is preferably metallic. The metallic laser beam absorbing body is preferably an alloy of Fe/Ne.

The absorbed beam of the preferred laser beam absorbing structural body has a wavelength of between about 248 nm to 249 nm, and more preferably a maximum wavelength of about 248 nm to 3271 nm. In another preferred form, the absorbed beam of the laser beam absorbing structural body has a wavelength of 192 nm to 194 nm.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
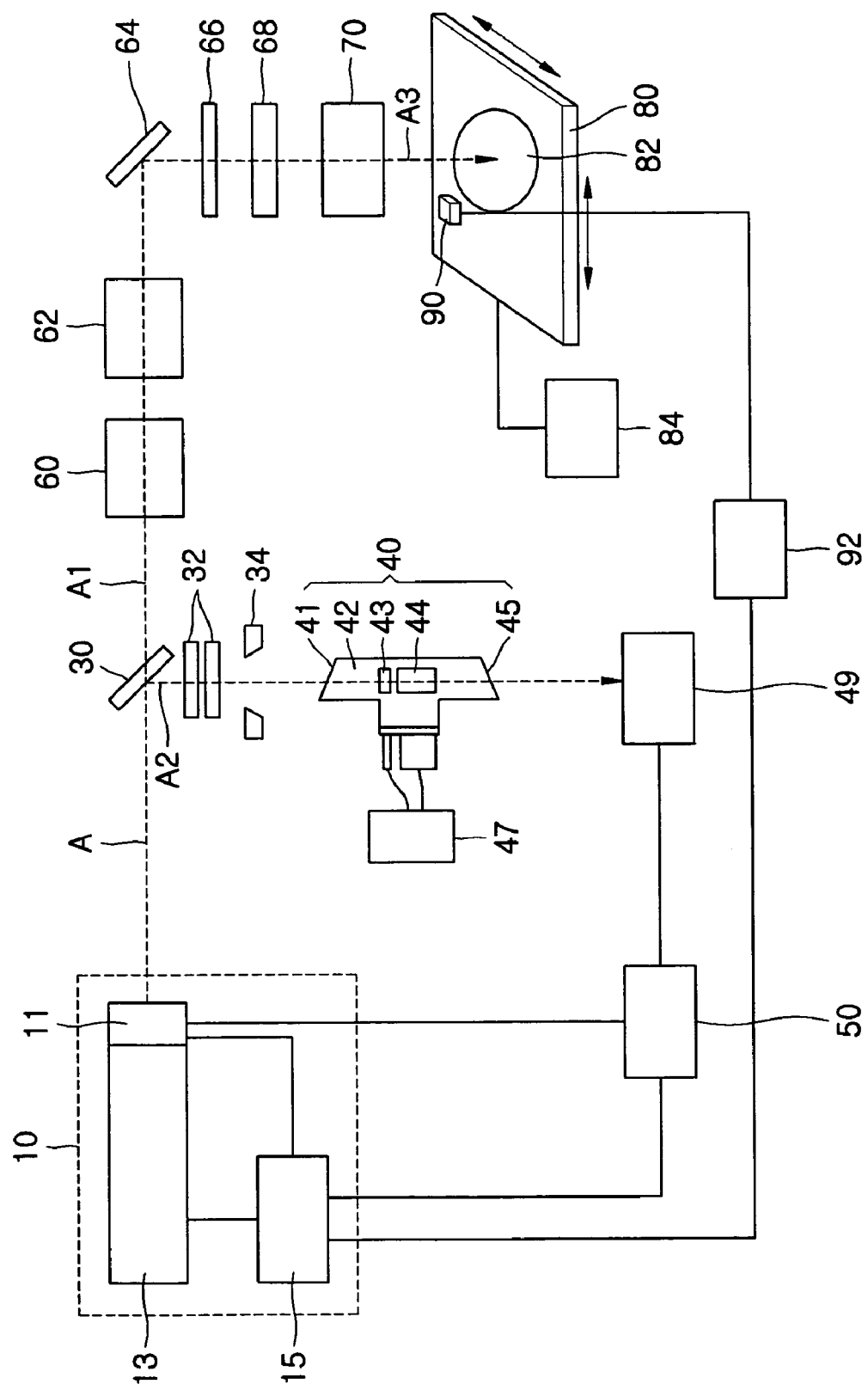
FIG. 1 is a schematic view illustrating a conventional system of detecting a wavelength of a laser beam by using a hollow cathode lamp.
Figure 2:
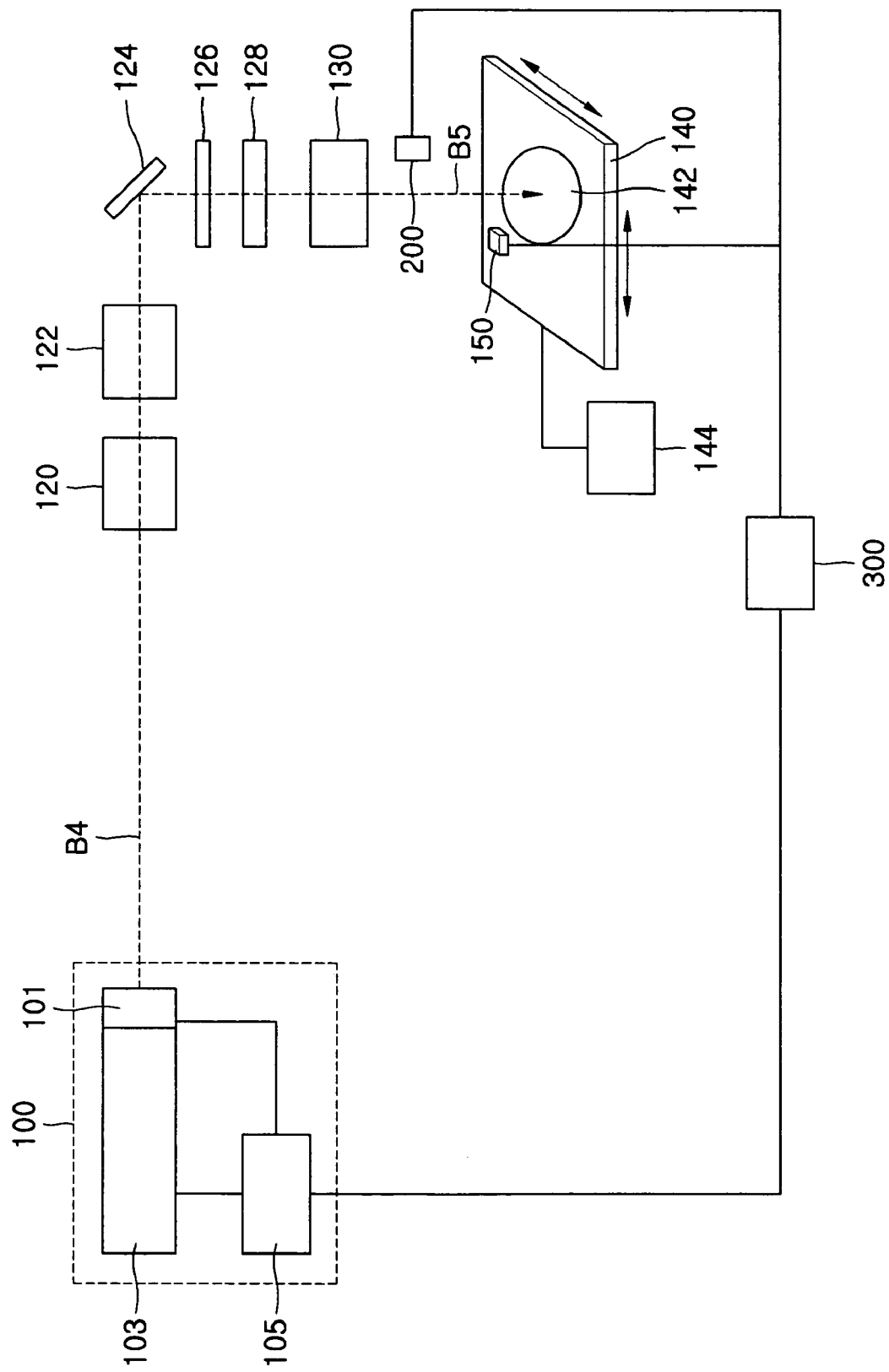
FIG. 2 is a schematic view illustrating a system of detecting a specific wavelength of a laser beam according to the present invention.

Referring to FIG. 2, a laser system 100 includes a laser 103, a wave meter 101 for sampling a fourth beam (B4) and determining a wavelength of the sampled fourth beam (B4), and a wavelength controlling unit 105 for selectively controlling the wavelength of the fourth beam (B4) at a specific wavelength range. The wave meter 101 controls the wavelength controlling unit 105. That is, if the detected fourth beam (B4) does not have the same wavelength as desired, the wave meter 101 sends a correction signal to the wavelength controlling unit 105 to control the wavelength of the detected fourth beam (B4).

The fourth beam (B4) can be applied not only to a KrF laser system, but also to a process using the laser beam substantially having a predetermined wavelength as a function of time, for example, to a process of manufacturing an integrated circuit. That is, the fourth beam (B4) can be also utilized in an ArF laser system, an optical pickup device and the like. Further, the fourth beam (B4) can be applied even to a stepper system and a scanner system for a lithography printing of the integrated circuit. The KrF laser system outputs the fourth beam (B4) with a wavelength of 247.9 nm to 248.7 nm. The wavelength controlling unit 105 controls the fourth beam (B4) by a wavelength step of about 0.1 nm. The ArF laser system can control the fourth beam (B4) with a wavelength of 192.5 nm to 193.5 nm by using an appropriate wavelength step.

The laser system may not include a wavelength measuring system such as the wave meter 101. In the laser system, the wavelength controlling unit 105 can directly control the wavelength. Further, the wavelength can be controlled using an angle of an optical structural element, a gas density of a pressure-controlled system, a temperature of a structural element, and the like.

The fourth beam (B4) is transmitted to a reticle 128 through a beam conditioner 120, a beam condenser 122, a beam splitter 124 and a lens 126. The beam conditioner 120 can include a series of lens units (not shown) to average a partial intensity of the fourth beam (B4). The beam conditioner 120 and the beam condenser 122 can extend the fourth beam (B4) according to a general method to form a rectangular beam. A mask pattern (not shown) formed on the reticle 128 refers to a copy of a photo resist pattern (not shown) formed on a wafer 142, and can be formed of chrome or an opaque material.

An optical convergence unit 130 irradiates a beam passing through the reticle 128, onto the wafer 142 located on a stage 140 for supporting wafer 142. A controller 144, typically an X-Y controller, can cause the stage 140 to move in a straight line and/or rotational path, preferably in an X-axis direction and/or a Y-axis direction. The stage 140 can be moved typically in a horizontal plane, preferably in both the X-axis direction and the Y-axis direction, and more preferably in both the X-axis direction and the Y-axis direction in the same horizontal plane.

Further, the fourth beam (B4) passes through the optical convergence unit 130 to become a fifth beam (B5) having an intensity and uniformity that can be varied. The fifth beam (B5) is substantially irradiated onto the wafer 142, and its intensity and uniformity is detected using a beam sensor 150 before it is irradiated onto the wafer 142. The detected result is used to allow a second controller 300 to again determine the magnitude of the fourth beam (B4) emitted from the laser system 100.

Furthermore, a specific wavelength detecting sensor 200 is disposed between the optical convergence unit 130 and the stage 140 to detect the specific wavelength of the fifth beam (B5). The specific wavelength detecting sensor 200 can be located along the path of the optical convergence unit 130, which forms the fifth beam (B5), before the wafer 142. It is preferably supported on the stage 140.

Figure 3:
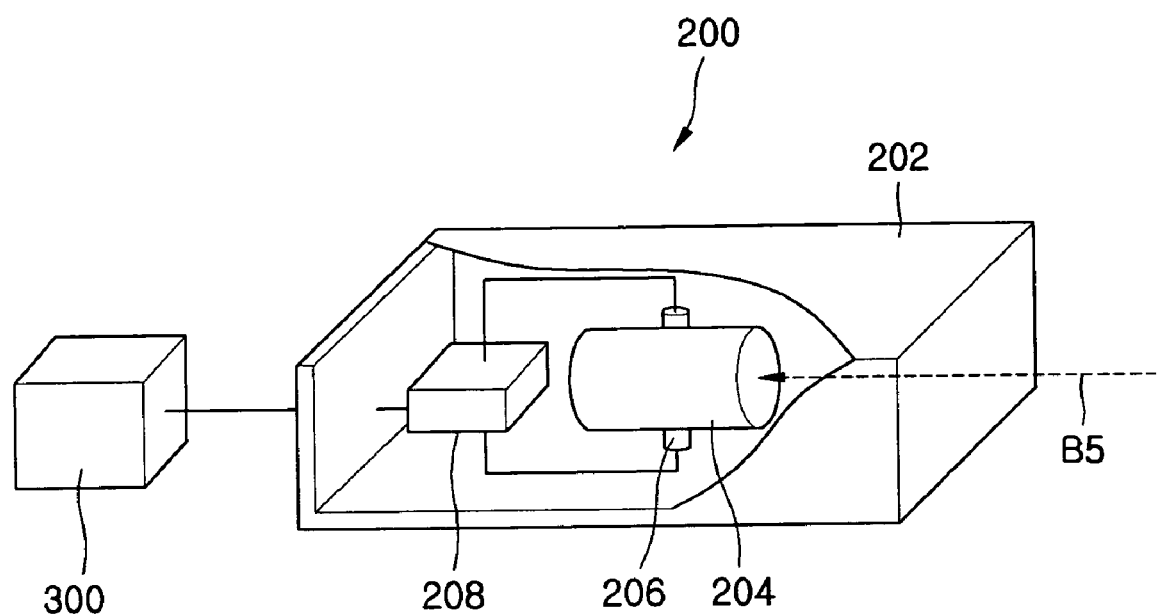
FIG. 3 is a perspective view illustrating a specific wavelength detecting sensor according to the present invention.

Referring to FIG. 3, the specific wavelength detecting sensor 200 includes a metal body 204 disposed inside a transparent vacuum tube 202 to absorb the fifth beam (B5) with the specific wavelength. The transparent vacuum tube 202 may be formed of a transparent material such as quartz, and can be maintained in an internal high vacuum state. The metal body 204 can absorb the fifth beam (B5) with the specific wavelength to vary its conductive rate. In other words, the metal body 204 absorbs the fifth beam (B5) with the specific wavelength to excite its carriers to reach a conductive band, thereby increasing the conductive rate. At this time, the metal body 204 can preferably be an alloy of Fe/Ne. Further, the absorbed beam can have a wavelength of 248 nm to 249 nm, and preferably can have a maximum wavelength of about 248 to 3271 nm. Furthermore, the absorbed beam can have a wavelength of about 192.50 nm to 193.5 nm.

Meanwhile, the metal body 204 may have at least one planar surface which is perpendicular to an incident direction of the fifth beam (B5) to smoothly absorb the fifth beam (B5). The specific wavelength detecting sensor 200 can additionally include a current sensor 208 electrically connected to a convergence terminal 206 provided at a sidewall of the metal body 204 to sense a variation of the conductive rate of the metal body 204. The current sensor 208 can be electrically connected with the wavelength controlling unit 105 through the second controller 300 for generating a wavelength control signal.

If a current variation measured by the current sensor 208 is not the same as a current variation at a desired wavelength, the second controller 300 sends a correction signal to the wavelength controlling unit 105 to control the wavelength.

According to the wavelength controlling system and its controlling method, the specific wavelength detecting sensor can be used to detect the variation of the conductive rate of the solid-state metal body, thereby stably detecting the specific wavelength. Further, the specific wavelength detecting sensor is located along the optical path to the optical convergence unit to accurately determine the specific wavelength directly irradiated on the wafer. Furthermore, the current sensor for sensing the conductive rate can be disposed inside the vacuum tube such that the specific wavelength detecting sensor has a unitary structure.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A system of controlling a wavelength of a laser beam, the system comprising:
   a stage for supporting a wafer;
   an optical convergence unit for emitting the laser beam moving in an optical path toward the stage;
   a specific wavelength detecting sensor, disposed between the optical convergence unit and the stage, including a laser beam absorbing structural body for absorbing a specific wavelength of the laser beam emitting toward the stage; and
   a wavelength controlling unit for selectively controlling the wavelength of the laser beam, wherein the laser beam structural absorbing body is an alloy of Fe/Ne.

2. The system of claim 1, wherein the stage can be moved in a straight line and/or rotational path.

3. The system of claim 1, wherein the specific wavelength detecting sensor is disposed within a transparent tube.

4. The system of claim 3, wherein the transparent tube comprises a transparent vacuum tube which is maintained under vacuum.

5. The system of claim 1, wherein the laser beam absorbing structural body absorbs the laser beam with the specific wavelength for varying its conductive rate.

6. The system of claim 1, wherein the laser beam absorbing structural body has at least one planar surface substantially perpendicular to the optical path of the laser beam.

7. The system of claim 1, wherein the specific wavelength detecting sensor further comprises a current sensor electrically connected with the laser beam absorbing structural body to sense a variation in the laser beam varies the conductive rate of the structural body.

8. The system of claim 7, wherein the current sensor is electrically connected with the wavelength controlling unit.

9. The system of claim 1, wherein the absorbed beam of the laser beam absorbing structural body has a wavelength of between about 248 nm to 249 nm.

10. The system of claim 1, wherein the absorbed beam of the laser beam absorbing structural body has a wavelength of between about 248 to 3271 nm.

11. The system of claim 1, wherein the absorbed beam of the laser beam absorbing structural body has a wavelength of about 192 nm to 194 nm.

12. A method of controlling a wavelength of a laser beam, the method comprising:
    providing a stage for supporting a wafer;
    irradiating the laser beam in an optical path toward the stage through an optical convergence unit;
    detecting a specific wavelength of an absorbed laser beam in a specific wavelength detecting sensor, the specific wavelength detecting sensor being disposed between the optical convergence unit and the stage and including a laser beam absorbing structural body for absorbing the laser beam with the specific wavelength; and
    controlling a wavelength control unit to regulate the detected laser beam to provide a maximum wavelength, wherein the laser beam absorbing structural body is an alloy of Fe/Ne.

13. The method of claim 12, wherein the laser beam absorbing structural body absorbs the laser beam with the specific wavelength for varying the rate of conductivity.

14. The method of claim 12, wherein the specific wavelength detecting sensor further comprises a current sensor electrically connected with the laser beam absorbing structural body to sense if the laser beam varies the conductive rate of the laser beam absorbing body.

15. The method of claim 12, wherein the absorbed beam of the laser beam absorbing structural body has a maximum wavelength of about 248 nm to 249 nm.

16. The method of claim 12, wherein the absorbed beam of the laser beam absorbing structural body has a maximum wavelength of about 248 to 3271 nm.

17. The method of claim 12, wherein the absorbed beam of the laser beam absorbing structural body has a wavelength of about 192 nm to 194 nm.

* * * * *